United States Patent
Pham et al.

(10) Patent No.: US 9,859,964 B2
(45) Date of Patent: Jan. 2, 2018

(54) COMPUTING PMIS, PARTICULARLY IN WIRELESS COMMUNICATIONS SYSTEMS HAVING A THREE-DIMENSIONAL COMMUNICATIONS CHANNEL

(71) Applicant: NEC Corporation, Minato-ku, Tokyo (JP)

(72) Inventors: Duong Pham, Mulgrave (AU); Yasushi Maruta, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/314,003

(22) PCT Filed: Mar. 19, 2015

(86) PCT No.: PCT/JP2015/059284
§ 371 (c)(1),
(2) Date: Nov. 25, 2016

(87) PCT Pub. No.: WO2015/194230
PCT Pub. Date: Dec. 23, 2015

(65) Prior Publication Data
US 2017/0195013 A1   Jul. 6, 2017

(30) Foreign Application Priority Data
Jun. 16, 2014   (AU) ................................ 2014902276

(51) Int. Cl.
*H04B 7/04*     (2017.01)
*H04B 7/0452*   (2017.01)
(Continued)

(52) U.S. Cl.
CPC ........... *H04B 7/046* (2013.01); *H01Q 21/061* (2013.01); *H04B 7/0452* (2013.01);
(Continued)

(58) Field of Classification Search
CPC .... H04B 7/046; H04B 7/0452; H04B 7/0626; H04B 7/063; H04B 7/0632; H04B 7/0691; H01Q 21/061
See application file for complete search history.

(56) References Cited

U.S. PATENT DOCUMENTS

2007/0281746 A1   12/2007   Takano et al.
2016/0080052 A1*   3/2016   Li ...................... H04B 7/0456
                                                            375/267
2017/0141822 A1*   5/2017   Pham ................... H04B 7/0452

FOREIGN PATENT DOCUMENTS

EP           2562951 A1      2/2013
WO       2014/038347 A1      3/2014

OTHER PUBLICATIONS

International Search Report for PCT Application No. PCT/JP2015/059284, dated Jun. 23, 2015.
(Continued)

*Primary Examiner* — Jaison Joseph

(57) ABSTRACT

A method for computing precoder matrix indicators (PMIs) in a wireless communication system is disclosed. The wireless communication system includes a base station (eNB) which is operable to communicate with one or more user equipments (UEs), and a set of transmit antennas associated with the eNB that have been partitioned into multiple antenna subsets. The UE(s) are operable to compute and report multiple PMIs for the said multiple antenna subsets to the eNB for the eNB to use in precoding. The method comprises computing a PMI for a given antenna subset using other already-computed PMI(s) for other(s) of the antenna subsets, such that the PMIs reported by the UE to the eNB account for correlation between the antenna subsets.

19 Claims, 6 Drawing Sheets

(51) Int. Cl.
 *H04B 7/06* (2006.01)
 *H01Q 21/06* (2006.01)
(52) U.S. Cl.
 CPC ........... *H04B 7/0473* (2013.01); *H04B 7/063* (2013.01); *H04B 7/0626* (2013.01); *H04B 7/0632* (2013.01); *H04B 7/0691* (2013.01)

(56) References Cited

OTHER PUBLICATIONS

Written Opinion of the International Searching Authority for PCT Application No. PCT/JP2015/059284.

\* cited by examiner

Pattern(3)

Pattern(2)

Pattern(1)

COMPUTING PMIS, PARTICULARLY IN WIRELESS COMMUNICATIONS SYSTEMS HAVING A THREE-DIMENSIONAL COMMUNICATIONS CHANNEL

This application is a National Stage Entry of PCT/JP2015/059284 filed on Mar. 19, 2015, which claims priority from Australian Patent Application 2014902276 filed on Jun. 16, 2014, the contents of all of which are incorporated herein by reference, in their entirety.

TECHNICAL FIELD

The present invention relates to the computation of precoder matrix indicators (PMIs) in communication systems in which an evolved Node B partitions a set of transmit antennas into multiple subsets, and in which UE(s) are configured to report (feed back) multiple PMIs for the multiple transmit antenna subsets.

BACKGROUND ART

Wireless communication systems are widely known in which base stations (also known as evolved Node Bs (eNBs)) communicate with mobile devices (also known as user equipments (UEs)) which are within range of the eNB. Each eNB divides its available bandwidth, i.e. frequency and time resources, into different resource allocations for the different UEs. There is a constant need to increase the capacity of such systems, and to improve the efficiency of resource utilisation, in order to accommodate more users (more UEs), more data-intensive services and/or higher data transmission rates.

OFDM (Orthogonal Frequency Division Multiplexing) is one technique used for transmitting data in wireless communication systems. An OFDM-based communications scheme divides data symbols to be transmitted among a large number of subcarriers; hence the term "frequency division multiplexing". Data is modulated onto a subcarrier by adjusting its phase, amplitude, or both phase and amplitude. The "orthogonal" part of the name OFDM refers to the fact that the spacings of the subcarriers in the frequency domain are chosen so as to be orthogonal, in a mathematical sense, to the other subcarriers. In other words, they are arranged in the frequency domain such that the sidebands of adjacent subcarriers may overlap but such that inter-subcarrier interference is sufficiently minimised for the subcarriers to be received.

When individual subcarriers or sets of subcarriers are assigned to different users (different UEs), the result is a multi-access system referred to as OFDMA (Orthogonal Frequency Division Multiple Access). The term OFDM is often intended to include OFDMA. The two terms may therefore be considered interchangeable for the purposes of the present explanation. By assigning distinct frequency/time resources to each UE in a cell, OFDMA can help to avoid interference among UEs within a given cell.

A further modification of the basic OFDM scheme is called MIMO which stands for "multiple-input multiple-output". This type of scheme employs multiple antennae at the transmitter and/or at the receiver (often at both) to enhance the data capacity achievable between the transmitter and the receiver. Typically, this is used to achieve enhanced data capacity between an eNB and the user equipment(s) (UE(s)) served by that eNB.

By way of example, a 2×2 "single user MIMO" (SU-MIMO) configuration contains two antennae at the transmitter and two antennae at a single receiver that is in communication with the transmitter. Likewise, a 4×4 SU-MIMO configuration contains four antennae at the transmitter and four antennae at the single receiver that is in communication with the transmitter. There is no need for the transmitter and receiver to employ the same number of antennae. Typically, an eNB in a wireless communication system will be equipped with more antennae in comparison with a UE, owing to differences in power, cost and size limitations. It should also be noted that so called "multi-user MIMO" (MU-MIMO) is often employed, and this involves a single eNB which is able to perform MIMO communication with multiple UEs at once. This is discussed further below.

The term "channel" is commonly used to refer to the frequency (or equivalently time delay) response of the radio link between a transmitter and a receiver. The MIMO channel (hereafter simply the "channel") contains all the subcarriers (see the discussion on subcarriers above), and covers the whole bandwidth of transmission. A MIMO channel contains many individual radio links. The number of these individual radio links, which may each be individually referred to as a single-input single-output (SISO) channel, is $N_{RX} \times N_{TX}$, where $N_{TX}$ is the number of antennae at the transmitter and $N_{RX}$ is the number of antennae at the receiver(s). For example, a 3×2 SU-MIMO arrangement contains 6 links, hence it has 6 SISO channels.

Considering the simplified 2×3 SU-MIMO system schematically represented in FIG. 1, it can be seen that antenna R0 of receiver R receives transmissions from each of the transmitter antennae T0, T1 and T2 of transmitter T. Similarly, receiver antenna R1 receives transmissions from transmitter antennae T0, T1 and T2. Therefore, the signal received at the receiver comprises (or is made up of) a combination of the transmissions (i.e. a combination of the six SISO channels) from the transmitter antennae. In general, SISO channels can be combined in various ways to transmit one or more data streams to the receiver.

FIG. 2 is a conceptual diagram of a more generalized SU-MIMO system. In FIG. 2, a transmitter transmits signals utilizing $N_{TX}$ transmitting antennae, and a single receiver receives the signals from the transmitter utilizing $N_{RX}$ receiving antennae. In order to create a mathematical model of the characteristics of the overall MIMO channel (in this case a SU-MIMO channel), it is necessary to represent the individual SISO channels between the transmitter and receiver. As shown in FIG. 2, the individual SISO channels are represented by $H_{0,0}$ to $H_{N_{RX-2}N_{TX-2}}$, and as suggested in the Figure, these form terms of a matrix commonly called the "channel matrix" or channel response matrix H. It will be recognised that $H_{0,0}$ represents the channel characteristics (for example, channel frequency response) for transmitting signals from transmitting antenna 0 to receiving antenna 0. Similarly, "$H_{N_{RX-2}N_{TX-2}}$" represents the channel characteristics for transmitting signals from the transmitting antenna $N_{TX-1}$ to the receiving antenna $N_{RX-1}$, and so on.

In FIG. 2, the symbols $x_0$ to $x_{N_{TX-2}}$, which represent the signal elements transmitted using the transmitting antennae 0 to $N_{TX-1}$ respectively, together form a transmitted signal vector $x=(x_0, x_1, \ldots, x_{N_{TX-2}})^T$, where $()^T$ indicates the vector transpose. (In other words, x is the signal transmitted from the transmitter.) Likewise, the received signals elements $y_0$ to $y_{N_{RX-2}}$ received by receiving antennae 0 to $N_{RX-1}$ respectively, together form received signal vector $y=(y_0, y_1, \ldots, y_{N_{RX-2}})^T$. (In other words, y is the signal received at the receiver.) The relationship between the vectors y and x for the simplified single user system shown in FIG. 2 may be modelled by the basic SU-MIMO system equation:

$$y = Hx + n \quad \text{(Equation 0)}$$

where H is the channel matrix referred to above and n is a vector representing noise (usually assumed to be additive white Gaussian noise).

It should be noted at this point that FIG. 1 and FIG. 2 (discussed above) both relate to "single user" MIMO (SU-MIMO) systems. However, as also mentioned above, so called "multi-user" MIMO (MU-MIMO) is often employed, and this involves a single eNB which has multiple antennas and which is able to perform MIMO communication with multiple UEs (each of which may also have multiple antennas) at once. A schematic representation of a MU-MIMO system is given in FIG. 3.

More specifically, FIG. 3 shows a general MU-MIMO system where the eNB transmits data to different UEs on the same time-frequency from multiple transmit antennas. To minimise interference between UEs, the eNB creates transmission beams through precoding.

According to Wikipedia for example, "precoding" is a generalization of "beamforming" and is used to support multi-stream transmission in multi-antenna wireless communications. In conventional single-stream beamforming, the same signal is emitted from each of the transmit antennas with appropriate weighting (phase and gain) such that the signal power is maximized at the receiver. When the receiver has multiple antennas, however, single-stream beamforming cannot simultaneously maximize the signal level at all of the receive antennas. In order to maximize the throughput in multiple receive antenna systems, multi-stream transmission is generally required.

In multi-user MIMO (MU-MIMO), a multi-antenna transmitter communicates simultaneously with multiple receivers (each having one or multiple antennas), as explained above. From an implementation perspective, precoding algorithms for MU-MIMO systems fall into linear and nonlinear precoding types. The capacity achieving algorithms are generally nonlinear, but linear precoding approaches may still achieve reasonable performance with much lower complexity. Linear precoding strategies include, for example, maximum ratio transmission (MRT), zero-forcing (ZF) precoding, and transmit Wiener precoding.

While performance maximization has a clear interpretation in point-to-point SU-MIMO, a multi-user system generally cannot simultaneously maximize the performance for all users. Multi-user systems may therefore be said to involve a multi-objective optimization problem where each objective corresponds to maximization of the capacity of one of the users. One common way of addressing this problem is to select a system utility function; for example, the weighted sum capacity where the weights correspond to the system's subjective user priorities.

In any case, at the receiving side, a UE uses postcoding (decoding) to obtain its data from the received signal.

Those skilled in the art will be appreciated from the discussion above that precoding is often highly dependent on the state of the channel (i.e. it is dependent on the "channel state")—see below.

Mathematically, a MU-MIMO system can be described (modelled) by modifying the simplified single user MIMO system equation (Equation 0) above as follows:

$$y(i) = H(i)V(i)x(i) + \sum_{k=1, k \neq i}^{N_{UE}} H(i)V(k)x(k) + n(i) \quad \text{(Equation 1)}$$

In Equation 1 above:
y(i) is the received signal at the i-th UE,
x(i) is the data signal for the i-th UE,
H(i) is the channel matrix for the i-th UE,
V(i) is the precoder matrix of the i-th UE,
n(i) is the additive white Gaussian noise at the i-th user.

MIMO transmission schemes may be said to be either "non-adaptive" or "adaptive". In the non-adaptive case, the transmitter does not have any knowledge of the condition or properties of the channel. In other words, the transmitter does not have any knowledge of the way a transmitted signal changes as it is transmitted "through the air". This lack of knowledge regarding the "channel state" can limit performance as the transmitter cannot take account of, for example, changes in conditions which cause changes in the state or properties of the channel (which affect how a transmitted signal changes "in the air"). Adaptive schemes rely on the feedback of information (so-called "channel-state information" or CSI) from the receiver to the transmitter (i.e. in the uplink (UL)), which allows modification of transmitted downlink (DL) signals to account for changing conditions (i.e. to account for the changing channel state) and to maximise data throughput. In other words, the feedback of CSI can be used to facilitate or assist with precoding. The present invention is concerned primarily with these adaptive types of MIMO schemes. The feedback of CSI in the uplink, from different UEs, is illustrated in FIG. 4.

The following table contains certain abbreviations/acronyms that may be found herein:

| | |
|---|---|
| CSI | channel state information (includes PMI, RI and CQI) |
| CQI | channel quality indicator |
| DL | downlink |
| eNB | evolved Node B (base station) |
| MIMO | multiple-input multiple-output |
| MU-MIMO | multi-user MIMO |
| OFDM | orthogonal frequency division multiplexing |
| OFDMA | orthogonal frequency division multiple access |
| PMI | precoder matrix indicator |
| RI | rank indicator |
| SISO | single-input single-output |
| SU-MIMO | single user MIMO |
| TxAn | transmit antenna |
| UE | user equipment |
| UL | uplink |

It is to be clearly understood that mere reference herein to previous or existing devices, apparatus, products, systems, methods, practices, publications or to any other information, or to any problems or issues, does not constitute an acknowledgement or admission that any of those things, whether individually or in any combination, formed part of the common general knowledge of those skilled in the field, or that they are admissible prior art.

SUMMARY OF INVENTION

In one broad form, the present invention relates to a method for computing precoder matrix indicators (PMIs) in a wireless communication system, the wireless communication system including a base station (eNB) which is operable to communicate with one or more user equipments (UEs) and a set of multiple transmit antennas associated with the eNB that are partitioned into multiple transmit antenna subsets, wherein the UE(s) are operable to compute multiple PMIs for the respective multiple transmit antenna subsets and to report the multiple PMIs to the eNB for the eNB to use in precoding, the method comprising computing a PMI for a given transmit antenna subset using other already-computed (or pre-set) PMI(s) for other(s) of the transmit antenna subsets. It is thought that this may help to enable the PMIs reported by the UE to the eNB to account for correlation between the transmit antenna subsets.

The wireless communication system in which embodiments of the above form of the invention are implemented may be a multiple-input multiple-output (MIMO) system. As described above, in MIMO systems, the multiple transmit antennas associated with the eNB are operable to transmit signals which can be received by multiple receiver antennas associated with a UE. Embodiments of the above form of the invention may also be suitable for implementation in multi-user MIMO (MU-MIMO) systems in which the multiple transmit antennas associated with the eNB are operable to transmit signals to a plurality of UEs, each of which has multiple receiver antennas, at once.

In most cases, it is envisaged that UE(s) will be operable to report the multiple PMIs to the eNB in the uplink. When this is the case, the computing by a UE of a PMI for a given transmit antenna subset using other already-computed (or pre-set) PMI(s) for other(s) of the transmit antenna subsets may involve computing the said given PMI, which is to be reported to the eNB in a given uplink transmission, using other already-computed (or pre-set) PMI(s) which are also to be reported to the eNB in the same uplink transmission. In other words, the PMIs computed by the UE (for the respective transmit antenna subsets) may be based on other PMIs which are to be reported by the UE to the eNB in the same uplink transmission (and not on, say, PMIs that were reported in a previous uplink transmission). In this way, the UE may report PMIs corresponding to the current (or most recent) state of the channel, thereby providing the most up-to-date information regarding the state of the channel to the eNB to use in precoding. (Incidentally, it will be appreciated that when a UE is computing the PMIs to be transmitted in a given uplink transmission, for the first said PMI to be computed there will not be another already-computed PMI to be reported on that same uplink transmission. Accordingly, for computing this first PMI, pre-set or pre-initialised parameters (equivalent to a pre-set PMI) may be used in the computation. This is discussed further in the Detailed Description section below.)

Following on from the above, it will be appreciated that the PMIs reported by a UE to the eNB will generally form part of the channel state information (CSI) reported to the eNB by the UE in the uplink. In this regard, it should be noted that the CSI will typically also include, in addition to the PMIs, a rank indicator (RI) and a channel quality indicator (CQI).

In many embodiments, the set of multiple transmit antennas associated with the eNB may comprise a two-dimensional (2D) array of transmit antennas. In such embodiments, partitioning the array of transmit antennas may involve grouping individual antennas together to form multiple groups of antennas such that each group forms a transmit antenna subset. Typically, the partitioning will be predefined for different transmit antenna array configurations. There may also be more than one possible partition arrangement (pattern) for a given antenna array configuration, and if so, which of the possible partition arrangements (patterns) is used may be configured by the eNB.

As explained in the Background section above, the channel H is the frequency response of the radio link between the transmit antennas associated with the eNB and the receiver antenna(s) associated with the UE(s). Partitioning the array of transmit antennas into N transmit antenna subsets may cause partitioning of the channel into N subchannels. In this context, $H_n$ refers to the channel (or the channel estimate) for the n-th antenna subset. Also, the subchannels may be of size $N_{RX} \times \mu_{TX}$, where $N_{RX}$ is the number of receiver antennas associated with the UE(s), $N_{TX}$ is the number of transmit antennas associated with the eNB, and $N\mu_{TX} = N_{TX}$.

In certain particular embodiments, the method for computing PMIs may involve:

A) initialising an initial composite channel matrix $G_0$ and initialising an initial composite precoder matrix $V_0$ (note: these are pre-set/pre-initialised parameters, as mentioned above);

B) Performing the following for each of antenna subsets n=1, . . . , N:
 (i) generating a new composite channel matrix $G_n$ using the previous composite channel matrix $G_{n-1}$ and the channel estimate $H_n$ of the current antenna subset;
 (ii) generating composite precoder candidates $V_p$ for p=1, . . . , $N_p$ using the previous composite precoder candidates $V_{n-1}$ and the precoder (codeword) of the PMI codebook $W_p$, p=1, . . . , $N_p$ which is of size $\mu_{TX} \times RI$;
 (iii) finding the PMI $p_n$ of the current antenna subset using the composite channel matrix $G_n$ and the composite precoder candidates $V_p$; and
 (iv) assigning a new composite precoder.

In embodiments of the invention involving the particular algorithm set out above, the initial composite channel matrix $G_0$ and the initial composite precoder matrix $V_0$ may both be initialised as empty matrices or alternatively they may be given pre-set initial values/entries.

Also, in embodiments of the invention involving the particular algorithm set out above, step (i) generating a new composite channel matrix $G_n$, may be performed according to $$G_n = [G_{n-1} H_n]$$

In addition, in embodiments of the invention involving the particular algorithm set out above, step (ii) generating composite precoder candidates $V_{p_n}$ for p=1, . . . , $N_p$, may be performed according to $$V_p = \begin{bmatrix} V_{n-1} \\ W_p \end{bmatrix}, p = 1, \ldots, N_P$$

Furthermore, in embodiments of the invention involving the particular algorithm set out above, step (iii) finding the PMI $p_n$ of the current antenna subset, may be performed according to $$p_n = \underset{p \in \{1, \ldots, N_p\}}{\operatorname{argmax}} \{\operatorname{tr}([G_n V_p]^H [G_n V_p])\}$$

Then, step (iv) assigning the new composite precoder (necessary for the purpose of computing the PMI of the next antenna subset), may be performed according to $$V_n = V_{p_n}$$

Any of the features described herein can be combined in any combination with any one or more of the other features described herein within the scope of the invention.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of figures as follows.

DESCRIPTION OF EMBODIMENTS

Figure 1:
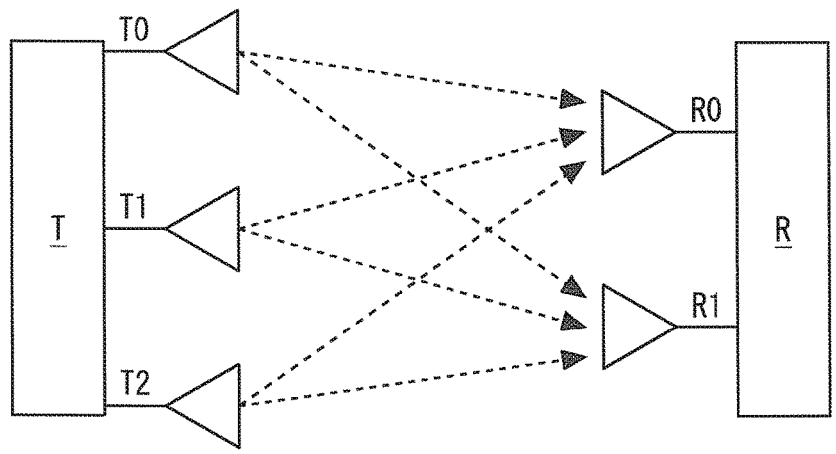
FIG. 1 schematically illustrates a simplified 2×3 SU-MIMO system.
Figure 2:
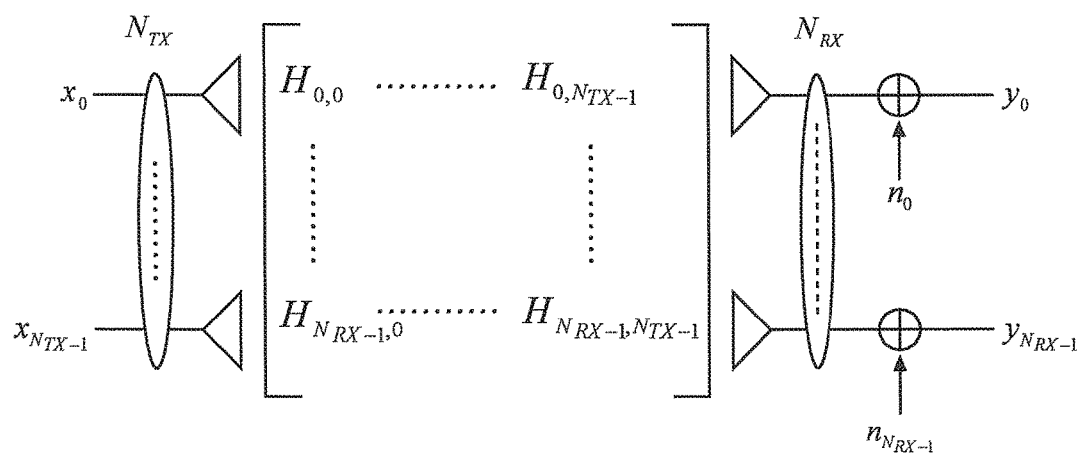
FIG. 2 is a conceptual diagram of a more generalized SU-MIMO system.
Figure 3:
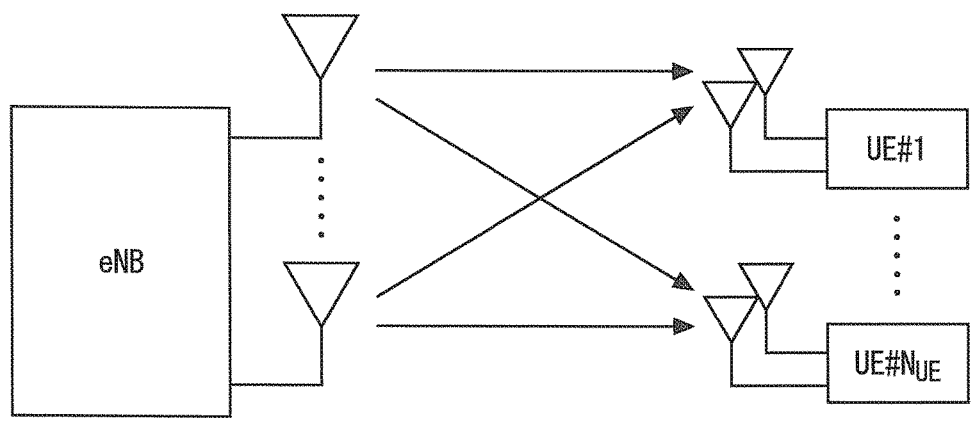
FIG. 3 shows a general MU-MIMO system where the eNB transmits data to different UEs on the same time-frequency from multiple transmit antennas, and each UE also has multiple antennas.
Figure 4:
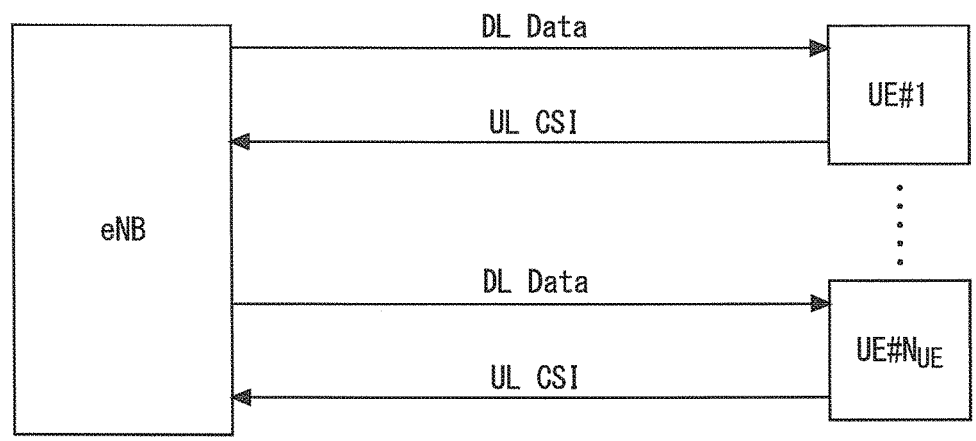
FIG. 4 illustrates the transmission of data in the downlink from the eNB to the different UEs, and also the feedback of CSI to the eNB in the uplink from the different UEs.
Figure 5:
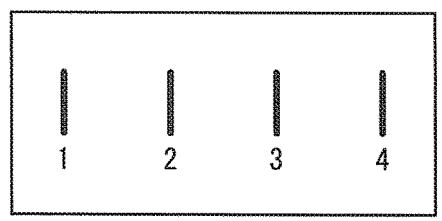
FIG. 5 schematically illustrates a 1-dimensional (1D) array of transmit antennas (i.e. a 1-dimensional antenna set).
Figure 6:
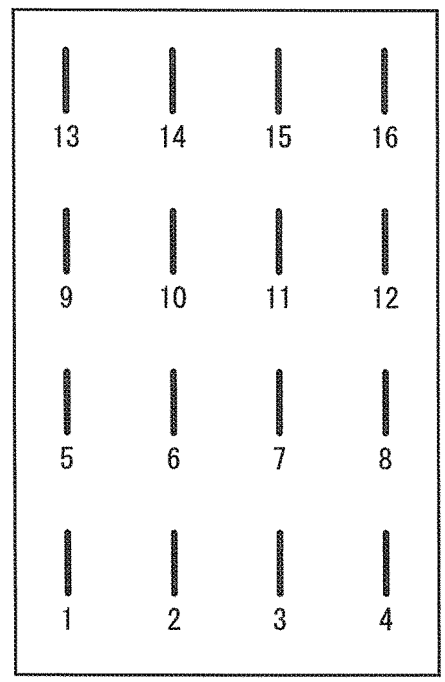
FIG. 6 schematically illustrates a 2-dimensional (2D) array of transmit antennas (i.e. a 2-dimensional antenna set).

In MIMO systems, the evolved Node B can be equipped with a 1-dimensional (1D) array of transmit antennas (see FIG. 5 as an example) or with a 2-dimensional (2D) array of transmit antennas (see FIG. 6 as an example). In the case of a 2D transmit antenna array, the communication channel becomes 3-dimensional (3D). The dimensions of the channel matrix can also be very large, especially for 2-D transmit antenna arrays (which create 3-D channels), which can lead to significant computational complexity, particularly in relation to computing the precoders as well as computing CSI.

Figure 7:
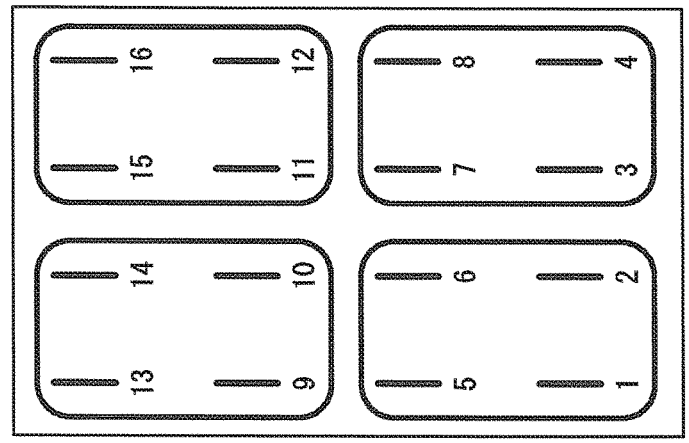
FIG. 7 illustrates various (non-limiting) examples of the way in which a 2-dimensional (2D) array of transmit antennas (i.e. a 2-dimensional antenna set) can be partitioned into multiple antenna subsets.
Figure 7:
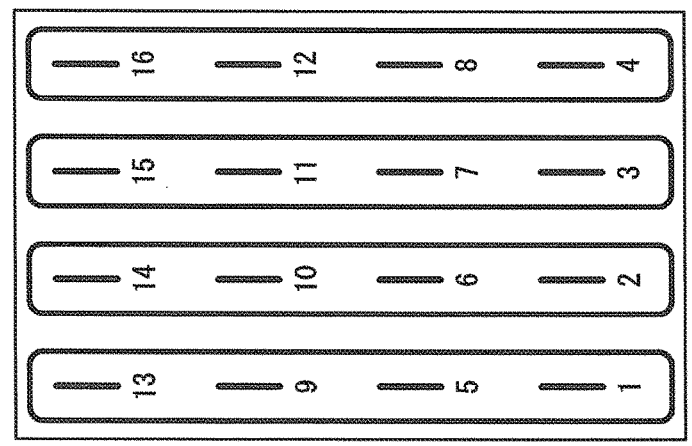
Figure 7:
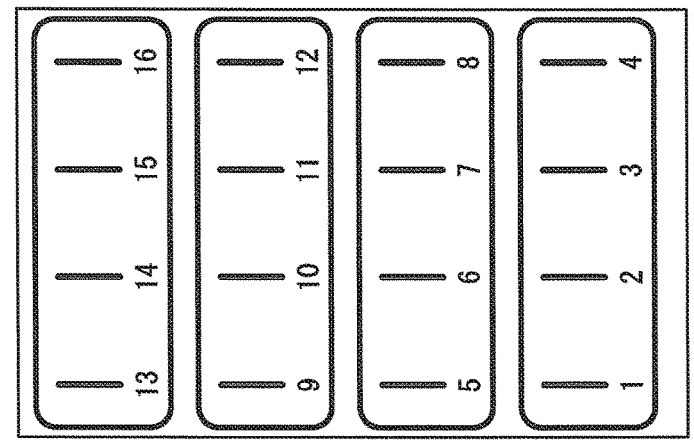

In order to help address these issues (i.e. to help reduce the computational complexity discussed above), the evolved Node B may partition the antenna set into multiple subsets and configure the (or each) UE to compute and report multiple PMIs. Examples of the way an antenna set can be partitioned are given in FIG. 7.

Figure 8:
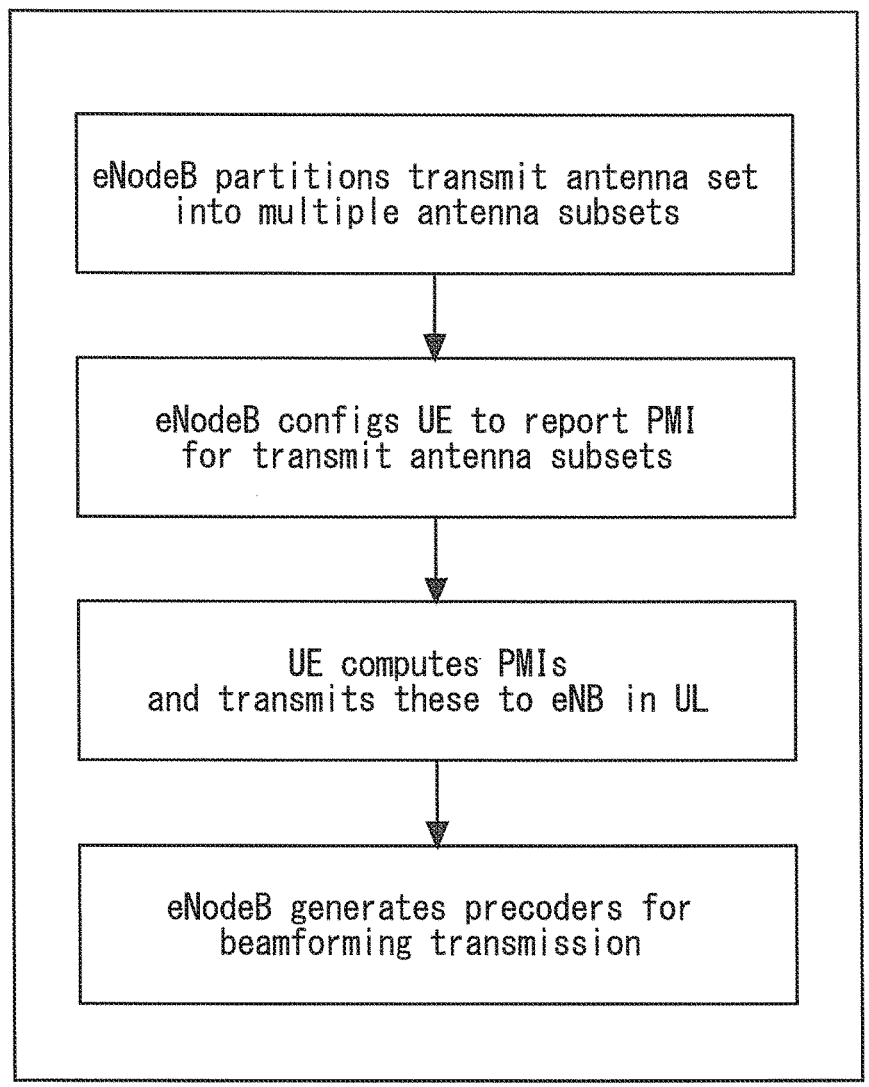
FIG. 8 is a graphical representation of the antenna partitioning process.

FIG. 8 illustrates the antenna partitioning process. As illustrated in FIG. 8, where an eNB partitions a transmit antenna set into multiple antenna subsets, the eNB also (as part of this) configures UEs to report PMIs for each of the defined antenna subsets. Accordingly, UEs compute the PMIs for the different antenna subsets and report these back to the eNB (as part of the CSI sent in the uplink), and the eNB then uses the reported PMIs to generate precoders for subsequent data transmissions (in the downlink).

At least some embodiments of the invention discussed herein may involve a PMI computation method which is performed at the UE and intended for use in the case where an evolved Node B partitions the transmit antenna set into multiple subsets (when none of the individual antennas or subsets are assigned as a reference) and the eNB configures UE(s) to measure/compute and report multiple PMIs. In certain particular embodiments, the computation by a UE of a PMI for a particular antenna subset may be based on the PMIs of other already-computed (or pre-set) PMIs of other antenna subsets (possibly based on all of the other already-computed (or pre-set) PMIs for all other antenna subsets).

Partitioning a set of transmit antennas (i.e. partitioning a TxAn set) into subsets causes, as a result of doing so, partitioning of the overall channel (where the overall channel is of size $N_{RX} \times N_{TX}$) into N subchannels of size $N_{RX} \times \mu_{TX}$, where $N\mu_{TX} = N_{TX}$. The partitioning may be predefined for different transmit antenna array configurations. In other words, a given transmit antenna array configuration may be partitioned in a particular predefined manner, and there may be different predefined partition arrangements (patterns) for different antenna array configurations. There may also be more than one possible partition arrangement (pattern) for a given antenna array configuration (the examples in FIG. 7 demonstrate this), and which of these possible partition arrangements (patterns) is used may be configured by the eNB.

Figure 9:
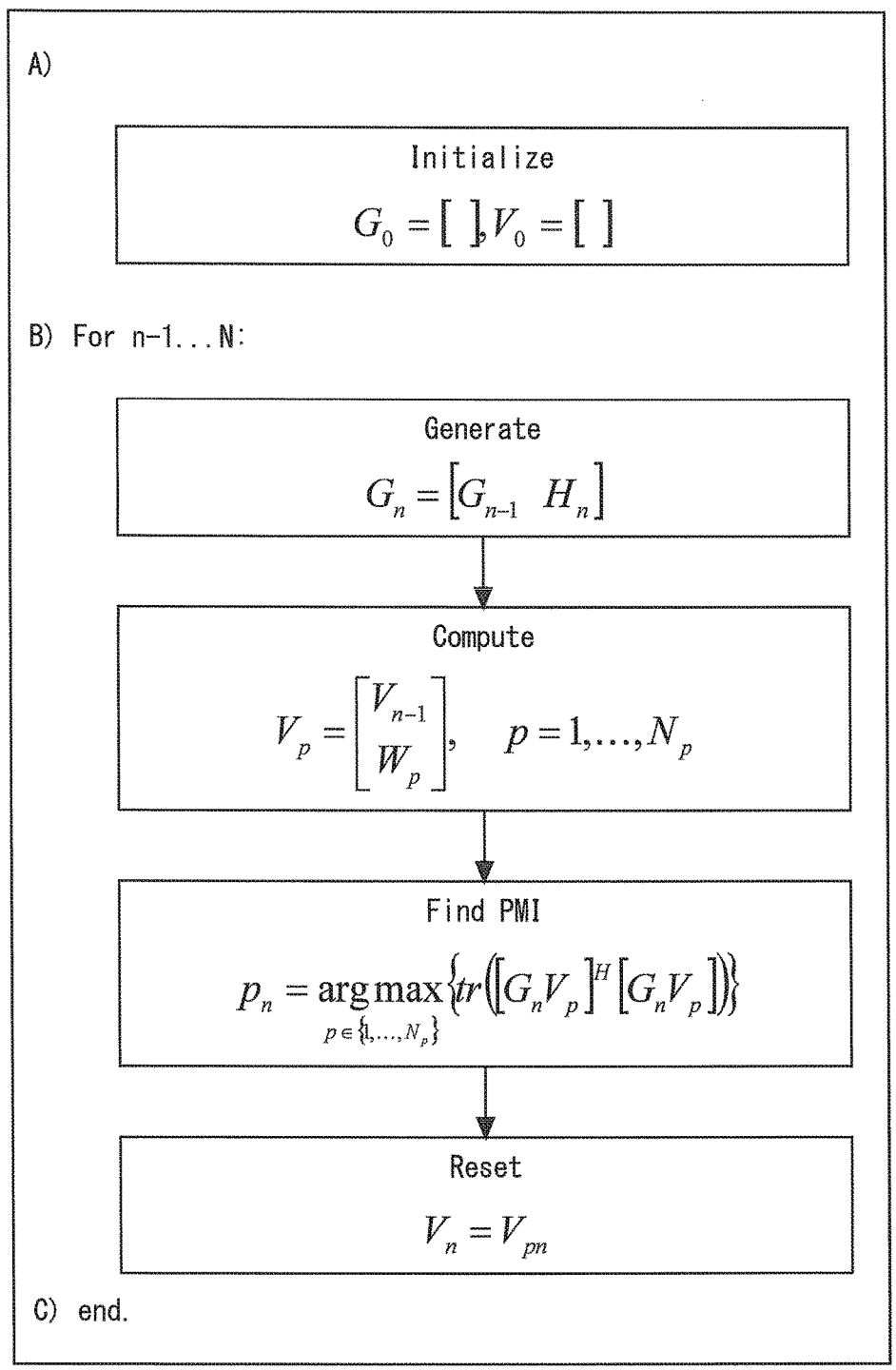
FIG. 9 is a graphical representation of an algorithm for computing PMIs according to one particular embodiment of the invention.

One particular algorithm that may be used for PMI computation is explained below and depicted in FIG. 9. In the algorithm:

$H_n$, n=1, ..., N of size $N_{RX} \times \mu_{TX}$ denotes the channel estimate of the n-th antenna subset;

$W_p$, p=1, ..., $N_p$ of size $\mu_{TX} \times RI$ denotes the precoder (codeword) of the PMI codebook; and $p_n$, n=1, ..., N denotes the PMI of the n-th antenna subset.

The particular algorithm is as follows:

A) Initialize empty matrices: $G_0 = [\ ]$, $V_0 = [\ ]$

B) For n=1, ..., N perform the following:

(i) Generate the composite channel matrix $G_n$ using:

$$G_n = [G_{n-1} H_n] \qquad \text{(Equation 2)}$$

(ii) Generate composite precoder candidates using:

$$V_p = \begin{bmatrix} V_{n-1} \\ W_p \end{bmatrix}, p = 1, \ldots, N_P \qquad \text{(Equation 3)}$$

(iii) Find the PMI $p_a$ using:

$$p_n = \underset{p \in \{1, \ldots, N_p\}}{\operatorname{argmax}} \{\operatorname{tr}([G_n V_p]^H [G_n V_p])\} \qquad \text{(Equation 4)}$$

(iv) Assign the new composite precoder candidate:

$$V_n = V_{p_n} \qquad \text{(Equation 5)}$$

C) End.

One of the advantages which the present invention is thought to achieve arises due to the fact that the different antenna elements of an overall antenna array are thought to exhibit correlation (i.e. the different individual antennas, and the different antenna subsets, are thought to be correlated). In conventional methods for PMI computation, PMIs for the different antenna elements of an overall antenna array are computed independently of one another. In contrast to this, the present invention enables computation of PMIs in a "joint" manner (e.g. in the present invention computation of the PMI for one antenna subset is performed using already-computed (or pre-set) PMI(s) for other antenna subset(s)) such that, with the present invention, the PMIs for different antenna subsets, which are reported back to the eNB together, capture the correlation that is thought to exist between antenna subsets.

By way of further explanation, because conventional methods for PMI computation determine PMIs for different antenna elements independently of one another (i.e. without reference to other PMIs for related antenna elements), it is thought that such conventional methods may consequently fail to account for the correlation that exists between antenna elements. This in turn may cause these conventional methods to provide inaccurate channel state information (recall that PMIs are fed back from UEs to the eNB as part of CSI in the uplink). And because the eNB relies upon the fed back CSI in order to calculate precoders for subsequent data transmissions, inaccurate channel state information could lead to poor precoding performance. It is thought that the present invention, by better accounting for the correlation that is thought to exist between antenna elements, may go at least some way to addressing this issue.

In the present specification and claims (if any), the word "comprising" and its derivatives including "comprises" and "comprise" include each of the stated integers but does not exclude the inclusion of one or more further integers.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

This application is based upon and claims the benefit of priority from Australian provisional patent application No. 2014902276, filed on Jun. 16, 2014, the disclosure of which is incorporated herein in its entirety by reference.

What is claimed is:

1. A method for computing precoder matrix indicators (PMIs) in a wireless communication system, the wireless communication system including a base station (eNB) which is operable to communicate with one or more user equipments (UEs) and a set of multiple transmit antennas associated with the eNB that are partitioned into multiple transmit antenna subsets, wherein the UE(s) are operable to compute multiple PMIs for the respective multiple transmit antenna subsets and to report the multiple PMIs to the eNB for the eNB to use in precoding, the method comprising:
computing a PMI for a given transmit antenna subset using other already-computed PMI(s) for other(s) of the transmit antenna subsets.

2. The method as claimed in claim 1 wherein the wireless communication system is a multiple-input multiple-output (MIMO) system wherein the multiple transmit antennas associated with the eNB are operable to transmit signals which can be received by multiple receiver antennas associated with a UE.

3. The method as claimed in claim 1 wherein the wireless communication system is a multi-user MIMO (MU-MIMO) system wherein the multiple transmit antennas associated with the eNB are operable to transmit signals to a plurality of UEs, each of which has multiple receiver antennas, at once.

4. The method as claimed in claim 1 wherein the UE(s) are operable to report the multiple PMIs to the eNB in the uplink.

5. The method as claimed in claim 4 wherein the computing by a UE of a PMI for a given transmit antenna subset using other already-computed PMI(s) for other(s) of the transmit antenna subsets involves computing the said given PMI, which is to be reported to the eNB in a given uplink transmission, using other already-computed PMI(s) which are also to be reported to the eNB in the same uplink transmission.

6. The method as claimed in claim 4 wherein the PMIs reported by a UE to the eNB form part of the channel state information (CSI) reported to the eNB by the UE in the uplink.

7. The method as claimed in claim 6 wherein the CSI includes the PMIs as well is a rank indicator (RI) and channel quality indicator (CQI).

8. The method as claimed in claim 1 wherein the set of multiple transmit antennas associated with the eNB comprises a two-dimensional (2D) array of transmit antennas.

9. The method as claimed in claim 8 wherein partitioning the array of transmit antennas involves grouping individual antennas together to form multiple groups of antennas such that each group forms a transmit antenna subset.

10. The method as claimed in claim 9 wherein the partitioning is predefined for different transmit antenna array configurations.

11. The method as claimed in claim 1 wherein the channel H is the frequency response of the radio link between the transmit antennas associated with the eNB and the receiver antenna(s) associated with the UE(s), partitioning the array of transmit antennas into N transmit antenna subsets causes partitioning of the channel into N subchannels, and $H_n$ is the channel estimate of the n-th antenna subset.

12. The method as claimed in claim 11 wherein the subchannels are of size $N_{RX} \times \mu_{TX}$, where $N_{RX}$ is the number of receiver antennas associated with the UE(s), $N_{TX}$ is the number of transmit antennas associated with the eNB, and $N\mu_{TX} = N_{TX}$.

13. The method as claimed in claim 11 wherein the method further involves:
A) initialising an initial composite channel matrix $G_0$ and initialising an initial composite precoder matrix $V_0$;
B) performing the following for each of antenna subsets n=1, . . . , N:
(i) generating a new composite channel matrix $G_n$ using the previous composite channel matrix $G_{n-1}$ and the channel estimate $H_n$ of the current antenna subset;
(ii) generating composite precoder candidates $V_p$ for p=1, . . . , $N_p$ using the previous composite precoder candidates $V_{n-1}$ and the precoder (codeword) of the PMI codebook $W_p$, p=1, . . . , $N_p$ which is of size $\mu_{TX} \times RI$;
(iii) finding the PMI of the current antenna subset $p_n$ using the composite channel matrix $G_n$ and the composite precoder candidates $V_p$;
(iv) assigning a new composite precoder.

14. The method as claimed in claim 13 wherein the initial composite channel matrix $G_0$ and the initial composite precoder matrix $V_0$ are both initialised as empty matrices.

15. The method as claimed in claim 13 wherein (i) generating a new composite channel matrix $G_n$ is performed according to the following equation $$G_n = [G_{n-1} H_n].$$

16. The method as claimed in claim 13 wherein (ii) generating composite precoder candidates $V_{p_n}$ for $p=1, \ldots, N_p$ is performed according to the following equation $$V_p = \begin{bmatrix} V_{n-1} \\ W_p \end{bmatrix}, p = 1, \ldots, N_P.$$

17. The method as claimed in claim 13 wherein (iii) finding the PMI $p_n$ of the current antenna subset is performed according to the following equation $$p_n = \underset{p \in \{1, \ldots, N_p\}}{\mathrm{argmax}} \{\mathrm{tr}([G_n V_p]^H [G_n V_p])\}.$$

18. The method as claimed in claim 13 wherein (iv) assigning the new composite precoder (for the purpose of finding the PMI of the next antenna subset) is performed according to the following equation $$V_n = V_{p_n}.$$

19. A wireless communication system comprising:

a base station (eNB) which is operable to communicate with one or more user equipments (UEs) and a set of multiple transmit antennas associated with the eNB that are partitioned into multiple transmit antenna subsets, wherein the UE(s) are operable to compute multiple PMIs for the respective multiple transmit antenna subsets and to report the multiple PMIs to the eNB for the eNB to use in precoding, and wherein a PMI for a given transmit antenna subset is computed using other already-computed PMI(s) for other(s) of the transmit antenna subsets.

* * * * *